United States Patent
Choi et al.

(10) Patent No.: US 10,142,245 B2
(45) Date of Patent: Nov. 27, 2018

(54) APPARATUS AND METHOD FOR PARALLEL PROCESSING

(71) Applicant: Electronics and Telecommunications Research Institute, Daejeon (KR)

(72) Inventors: Kang-Il Choi, Daejeon (KR); Bhum-Cheol Lee, Daejeon (KR); Jung-Hee Lee, Daejeon (KR); Hyun-Yong Lee, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 213 days.

(21) Appl. No.: 15/180,815

(22) Filed: Jun. 13, 2016

(65) Prior Publication Data

US 2017/0041237 A1    Feb. 9, 2017

(30) Foreign Application Priority Data

Aug. 5, 2015 (KR) ..................... 10-2015-0110621

(51) Int. Cl.
*H04L 12/851* (2013.01)
*H04L 12/861* (2013.01)

(52) U.S. Cl.
CPC .......... *H04L 47/2441* (2013.01); *H04L 49/90* (2013.01)

(58) Field of Classification Search
CPC ................ H04L 47/2441; H04L 49/90
See application file for complete search history.

(56) References Cited

U.S. PATENT DOCUMENTS

| | | | |
|---|---|---|---|
| 5,854,117 A | 12/1998 | Huisman et al. | |
| 7,492,781 B2* | 2/2009 | Klotsche | H04L 47/20 370/235 |
| 7,701,849 B1* | 4/2010 | Ma | H04L 12/4625 370/230 |
| 7,765,405 B2 | 7/2010 | Pinkerton et al. | |
| 7,924,860 B1* | 4/2011 | Frailong | H04L 49/552 370/413 |
| 8,346,999 B2 | 1/2013 | Dubal et al. | |
| 8,571,848 B2 | 10/2013 | Shin | |
| 2014/0359225 A1 | 12/2014 | Lee | |

FOREIGN PATENT DOCUMENTS

| | | |
|---|---|---|
| KR | 10-2009-0094256 A | 9/2009 |
| KR | 10-2011-0035853 A | 4/2011 |
| KR | 10-1350333 B1 | 1/2014 |
| KR | 10-2014-0139923 A | 12/2014 |

* cited by examiner

*Primary Examiner* — Jamal Javaid
(74) *Attorney, Agent, or Firm* — Rabin & Berdo, P.C.

(57) ABSTRACT

An apparatus for parallel processing according to an example may include a queue memory configured to store one or more queues, a data memory configured to store data, a mapper configured to classify the data into flows and store a pointer of the data in a queue mapped with the flow; a plurality of processors configured to perform a process based on the data; and a distributor configured to extract the data from the data memory by referring to the pointer stored in the queue and transmit the data to the processor, wherein the distributor transmits data corresponding to a single queue to a single processor.

12 Claims, 3 Drawing Sheets

APPARATUS AND METHOD FOR PARALLEL PROCESSING

CROSS REFERENCE TO RELATED APPLICATION

This application claims the benefit under 35 U.S.C. § 119(a) of Korean Patent Application No. 10-2015-0110621 filed on Aug. 5, 2015 in the Korean Intellectual Property Office, the entire disclosure of which is incorporated herein by reference for all purposes.

BACKGROUND

1. Technical Field

The following description relates to technology for parallel processing in a multiprocessor environment or multi-core environment.

2. Description of Related Art

A data processing system of multi-core environment is a processing technique to speed up network traffic performances. In the data processing system, an order of processing data, of which order is set, is needed to be maintained even though one or more multi-cores simultaneously perform parallel processings for the data. Parallel network processor array (PNPA) and receive side scaling (RSS) techniques are provided to resolve such problems. According to PNPA and RSS techniques, a multiprocessor-based router performs flow identification for received network traffics and classifies the network traffics into a plurality of flows, and a corresponding processor performs processing for each flow. In addition, traffics identified as the same flow are assigned to the same processor for continuous processing so that network traffics can be distributed to and processed at the same time by multiprocessors for parallel processing at high speed in a multiprocessor environment. However, such techniques cannot provide processor scaling according to the network traffics since processor mapping for flows is fixed regardless of network traffic conditions.

Dynamic receive queue balancing with high and low thresholds (DRQB) technique is introduced to provide scaling for processors in order to improve the RSS technique. DRQB technique assigns application programs to different processors based on amount of traffics and data processed by a corresponding application program is assigned dynamically to a processing queue of a new processor. Thus, the DRQB technique provides processor scaling based on amount of traffics. However, since the DRQB technique causes a problem of re-ordering of data during the processor scaling process, it cannot provide effective processor (or core) scaling.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An object of this description is to provide an apparatus for parallel processing which performs parallel processing of data, of which order is set, in a multiprocessor or multi-core environment, does not cause re-ordering of data, and provides processor (or core) scaling based on network traffic conditions.

According to one general aspect, an apparatus for parallel processing may include a queue memory configured to store one or more queues, a data memory configured to store data, a mapper configured to classify the data into flows and store a pointer of the data in a queue mapped with the flow; a plurality of processors configured to perform a process based on the data; and a distributor configured to extract the data from the data memory by referring to the pointer stored in the queue and transmit the data to the processor, wherein the distributor transmits input data corresponding to a single queue to a single processor.

The apparatus for parallel processing may further include a table provider configured to store a flow table including queue information mapped with flow information, wherein the mapper identifies the queue mapped with the flow by referring to the flow table.

The mapper may map the flow with a new queue or an activated queue when the activated queue is not mapped with the flow by referring to the flow table.

The mapper may map the flow with the new queue when all of the number of pointers stored in each activated queue is higher than a predetermined critical value, and the mapper may map the flow with the activated queue when there is at least one activated queue of which the number of pointers is not higher than a predetermined critical value.

The apparatus for parallel processing may further include a distributor manager configured to assign a distributor for the new queue when the mapper maps the flow with the new queue, and a processor manager configured to assign a single processor for the new queue.

The mapper may map the flow with the queue where the least pointer is stored among the activated queues when there is at least one activated queue of which the number of pointers is not higher than a predetermined critical value and a mapping mode is a power saving mode.

The mapper may map the flow with the queue where the most pointer is stored among the activated queues when there is at least one activated queue of which the number of pointers is not higher than a predetermined critical value and a mapping mode is an even distribution mode.

According to another general aspect, a method for parallel processing may include receiving data and storing the data in a data memory; classifying the data into flows; storing a pointer of the data in a queue which is mapped with the flow; extracting the data from the data memory by referring to the pointer stored in the queue and transmitting the data to a processor which is assigned for the queue; and performing a process corresponding to the data using the processor assigned for the queue.

The method for parallel processing may further include identifying a queue mapped with the flow by referring to a flow table including queue information mapped with flow information.

The method for parallel processing may further include mapping the queue with a new queue or an activated queue when the flow is not mapped with the activated queue by referring to the flow table.

The mapping the queue with a new queue or an activated queue when flow information corresponding to the flow is not stored in the flow table, may include mapping the flow with a new queue when flow information corresponding to the flow is not stored in the flow table and all of the number of pointers stored in each activated queue is higher than a predetermined critical value; and mapping the flow with an activated queue when flow information corresponding to the flow is not stored in the flow table and there is at least one activated queue of which the number of pointers is not higher than a predetermined critical value.

The method for parallel processing may further include assigning a distributor for the new queue when the flow is mapped with the new queue; and assigning a single processor for the new queue.

The mapping the flow with an activated queue when flow information corresponding to the flow is not stored in the flow table and there is at least one activated queue of which the number of pointers is not higher than a predetermined critical value, may include mapping the flow with the queue where the least pointer is stored among the activated queues when a mapping mode is a power saving mode.

The mapping the flow with an activated queue when flow information corresponding to the flow is not stored in the flow table and there is at least one activated queue of which the number of pointers is not higher than a predetermined critical value, may include mapping the flow with the queue where the most pointer is stored among the activated queues.

The apparatus and method for parallel processing according to an example may perform parallel processing for data of which order is set in a multiprocessor environment or multi-core environment.

The apparatus and method for parallel processing according to an example may not cause re-ordering of data, while providing processor (or core) scaling based on network traffic conditions.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
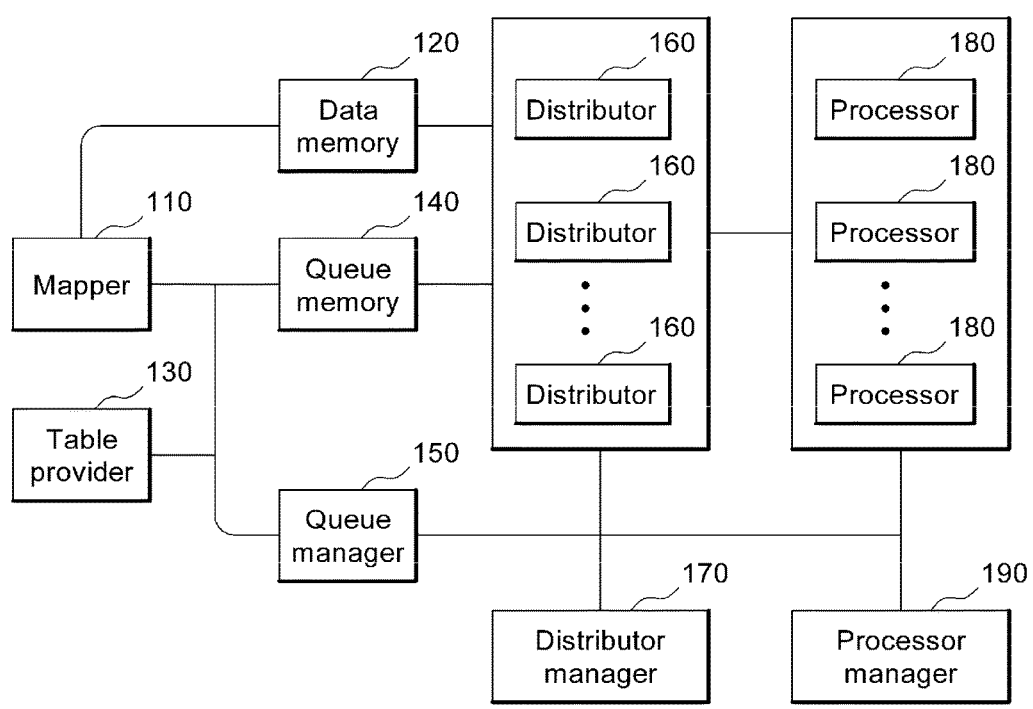
FIG. 1 is a diagram illustrating an example of an apparatus for parallel processing.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terms used in the description are intended to describe certain embodiments only, and shall by no means restrict the present disclosure. Unless clearly used otherwise, expressions in the singular number include a plural meaning.

In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

The terminology used herein is for the purpose of describing particular examples only, and is not intended to limit the scope of the disclosure in any way. As used herein, the singular forms "a," "an," and "the" are intended to include the plural forms as well, unless the context clearly indicates otherwise. It will be further understood that the terms "include" and/or "have," when used in this specification, specify the presence of stated features, numbers, operations, elements, components, or combinations thereof, but do not preclude the presence or addition of one or more other features, numbers, operations, elements, components or combinations thereof.

The terms used herein may be exchangeable to be operated in different directions than shown and described herein under an appropriate environment. It will be understood that when an element is referred to as being "transmitted" or "sent" to another element, it can be directly transmitted or sent to the other element or intervening elements may be present.

Unless otherwise defined, all terms, including technical and scientific terms, used herein have the same meaning as commonly understood by one of ordinary skill in the art to which this description pertains. It will be further understood that terms, such as those defined in commonly used dictionaries, should be interpreted as having a meaning that is consistent with their meaning in the context of the relevant art and are not to be interpreted in an idealized or overly formal sense unless expressly so defined herein.

FIG. 1 is a diagram illustrating an example of an apparatus for parallel processing.

Referring to FIG. 1, an apparatus for parallel processing according to an example may include a mapper 110, a data memory 120, a table provider 130, a queue memory 140, a queue manager 150, a plurality of distributors 160, a distributor manager 170, a plurality of processors 180, and a processor manager 190.

The mapper 110 may receive data (hereinafter, the data which the mapper 110 receives is referred to as 'input data') through network and classify the input data into any one of predetermined flows based on attributes thereof by referring to a flow table, store the input data in the data memory 120, and store a pointer indicating an address, where the input data is stored, in a queue mapped with the flow of the input data. Here, the flow table may be a table representing mapping relationship between each flow and each queue. For example, the flow table may be a table in which queue information, which is identification information to identify one queue from another one, is mapped with flow information, which is a value bit-masked for a value included in a header of input data or a value included in payload information of input data (hereinafter, referred to as "identification reference value") such as a SIP (Source Internet Protocol) address value, a DIP (Destination Internet Protocol) address value, a SPORT (Source Port) field value, DPORT (Destination Port) field value, a PROTOCOL field value, and the like, and the result is stored. The mapper 110 may search queue information mapped with the value bit-masked for the identification reference value from the flow table and store a pointer corresponding to the input data in a queue based on the queue information.

On the other hand, the flow table may be also a table in which flow information, which is a predetermined size value obtained by applying a hash function for the identification reference value, is mapped with queue information and the result is stored. The mapper 110 may search the queue information mapped with the predetermined size value obtained by applying a hash function for the identification reference value in the flow table and store a pointer corresponding to the input data in a queue based on the queue information.

In addition, the flow table may be also a table in which queue information is stored in a corresponding address when the address is flow information, which is a predetermined size value obtained by applying a hash function for the identification reference value. The mapper 110 may store a pointer corresponding to the input data in a queue corresponding to the queue information stored in a storage region of which address is flow information, which is a predetermined size value obtained by applying a hash function for the identification reference value.

Furthermore, the mapper 110 may map flow expiry information of each flow with the flow information and store the result in the flow table. The flow expiry information may be a value of 1 bit or more and may be reference information to determine the time to deactivate each flow.

The mapper 110 may extract queue information which is mapped with corresponding flow information and store a pointer corresponding to input data in a queue corresponding to the queue information when flow information corresponding to the input data is mapped with the queue information. The mapper 110 may determine whether all of the number of pointers stored in each activated queue in the queue memory 140 is higher than a predetermined critical value when flow information corresponding to the input data is not mapped with the queue information. When it is determined as that all of the number of pointers stored in each activated queue in the queue memory 140 is higher than the predetermined critical value, the mapper 110 may transmit a queue generation request signal for requesting generation of a new queue to the queue manager 150. When queue information is received from the queue manager 150, the mapper 110 may store a pointer corresponding to the input data in a new queue. In addition, when all of the number of pointers stored in each activated queue in the queue memory 140 is not higher than a predetermined critical value, the mapper 110 may store a pointer corresponding to the input data in any one queue of the activated queues in the queue memory 140. Here, the mapper 110 may store a pointer corresponding to the input data in a queue where the most pointers are stored among the queues of which the number of pointers is not higher than the predetermined critical value when a predetermined mapping mode is a "power saving mode". On the other hand, the mapper 110 may store a pointer corresponding to the input data in a queue where the least pointers are stored among the queues of which the number of pointers is not higher than the predetermined critical value when a predetermined mapping mode is an "even distribution mode". Here, the mapping mode may be a mode which is predetermined by a user and may be divided into a "power saving mode" and an "even distribution mode" which describe how a pointer is stored in a queue. After storing a pointer in a queue, the mapper 110 may perform an update process by mapping each of flow information with queue information and storing the result in the flow table and then transmit a queuing completion signal which notifies the completion of queuing a pointer for the input data to the queue manager 150. In addition, when a flow corresponding to the input data is a new flow (when flow information is not mapped with queue information), the mapper 110 may transmit a new flow signal, which notifies queuing a pointer of the new flow, to the queue manager 150 after queuing for the input data is complete.

In addition, when a pointer corresponding to the input data is stored in a queue corresponding to the queue information, the mapper 110 may reset flow expiry information mapped with the flow information corresponding to the input data to a predetermined value.

The data memory 120 may store input data when the input data is received from the mapper 110.

The table provider 130 may store the flow table and search or update the flow table based on request of the mapper 110.

The queue memory 140 may store a pointer corresponding to the input data through one or more queues.

When a queue generation request signal is received from the mapper 110, the queue manager 150 may generate a new queue in the queue memory 140 and transmit a queue generation completion signal which indicates the completion of generating the new queue to the distributor manager 170 and the processor manager 190. When an assignment completion signal, which notifies completion of assigning the distributor 160 to distribute the data stored in the new queue or of assigning the processor 180 to process the data stored in the new queue, is received from the distributor manager 170 and the processor manager 190, the queue manager 150 may update a queue table to store the queue information corresponding to the new queue in the table provider 130. Here, the queue table may be a table to map currently activated queue information with queue expiry information and the number of pointers stored in each queue, and store the result. The queue expiry information may be a value of 1 bit or more and may be information to determine the time to deactivate each queue, and the initial value thereof may be 0. After updating the queue table, the queue manager 150 may transmit the new queue information to the mapper 110. When a queuing completion signal is received from the mapper 110, the queue manager 150 may update the number of queued pointers (increased by 1) in a queue corresponding to the queuing completion signal. When a new flow signal is received from the mapper 110, the queue manager 150 may increase the queue expiry information by 1.

One or more distributors 160 may extract input data corresponding to the pointer stored in one or more queues from the data memory 120 and distribute the input data into one or more processors 180 based on load distribution such as Round robin, weighted Round robin and the like. The distributor 160 may distribute the input data included in a flow corresponding to a single queue to the single processor 180. That is, the distributor 160 may not distribute the input data included in a flow corresponding to a single queue to a plurality of different processors 180. Here, after transmitting the input data corresponding to the pointer stored in a queue, the distributor 160 may transmit a distribution completion signal to the queue manager 150. When the distribution completion signal is received, the queue manager 150 may deduct the number of pointers corresponding to the queue stored in the queue table.

When a queue generation completion signal for the new queue is received from the queue manager 150, the distributor manager 170 may assign a distributor to distribute the new queue. After the distributor is assigned, the distributor manager 170 may transmit an assignment completion signal to the queue manager 150. The distributor 160 may distribute the input data corresponding to the queue assigned by the distributor manager 170 to one or more processors 180.

The one or more processors 180 may receive the input data from the distributor 160 and perform processing based on the input data. Here, when the processor 180 can process the data of all flows corresponding to a single queue, it may process all data of the corresponding flow regardless of the number of flows. On the other hand, when the processor 180 cannot process the data of all flows corresponding to a single queue, the queue manager 150 may generate a new queue in the queue memory 140 and transmit a queue generation completion signal to the distributor manager 170 and the processor manager 190. Here, when the number of pointers stored in a single queue is higher than a predetermined critical value by referring to the queue table, the queue manager 150 may determine that the processor 180 cannot process the data of all flows corresponding to the single queue. When the number of pointers stored in a single queue is equal to or less than a predetermined critical value by referring to the queue table, the queue manager 150 may determine that the processor 180 can process the data of all flows corresponding to the single queue.

The plurality of processors 180 may receive the data from the distributor 160 and perform processing based on the received data. It is apparent that an apparatus for parallel processing according to an example may include one or more multi-core processors including a plurality of cores even though the apparatus for parallel processing including a plurality of processors is described in the detailed description. In addition, each processor 180 in FIG. 1 may be a single core. The processor 180 may be CPU for executing the processing instructions included in the input data, cores or semiconductor elements of CPU.

When a queue generation completion signal for the new queue is received from the queue manager 150, the processor manager 190 may assign a processor 180 for processing the input data based on the new queue. Here, the processor manager 190 may activate a new processor, which does not process the input data of an existing queue, for the new queue and manage for the new processor to process the input data corresponding to the new queue.

The mapper 110 may initialize and deactivate flow information corresponding to a deactivatable flow, queue information and flow expiry information by periodically referring to the flow expiry information of the flow table. The mapper 110 may periodically deduct the flow expiry information for each flow of the flow table by 1 and determine that the flow, of which flow expiry information is 0, is a deactivatable flow.

In addition, the mapper 110 may deduct the queue expiry information for the queue, to which the flow of which flow expiry information is 0 is mapped, among the queue expiry information stored in the queue table, by 1.

The queue manager 150 may identify a deactivatable queue by periodically referring to the queue table. For example, the queue manager 150 may determine the queue, of which queue expiry information is 0 and the number of pointers stored in the queue table is 0, as a deactivatable queue. When at least one queue can be deactivatable, the queue manager 150 may transmit a deactivation request signal for request deactivation for the corresponding queue to the distributor manager 170 and the processor manager 190.

When the deactivation request signal is received, the distributor manager 170 may manage to stop for the one or more distributors 160 to distribute the input data corresponding to the queue. In addition, when one or more distributors 160 do not perform distributing the input data, the distributor manager 170 may deactivate the corresponding distributor 160.

When the deactivation request signal is received, the processor manager 190 may deactivate the processor 180 which processes the input data for the queue requested for deactivation. The processor manager 190 may control a power supply (not shown) to allow or block the power which is provided to the processor 180 to activate a new processor or deactivate an activated processor. The processor manager 190 may also activate a new processor or deactivate an activated processor by control at least one of voltage which is applied to the processor 180 and clock of the processor.

Figure 2:
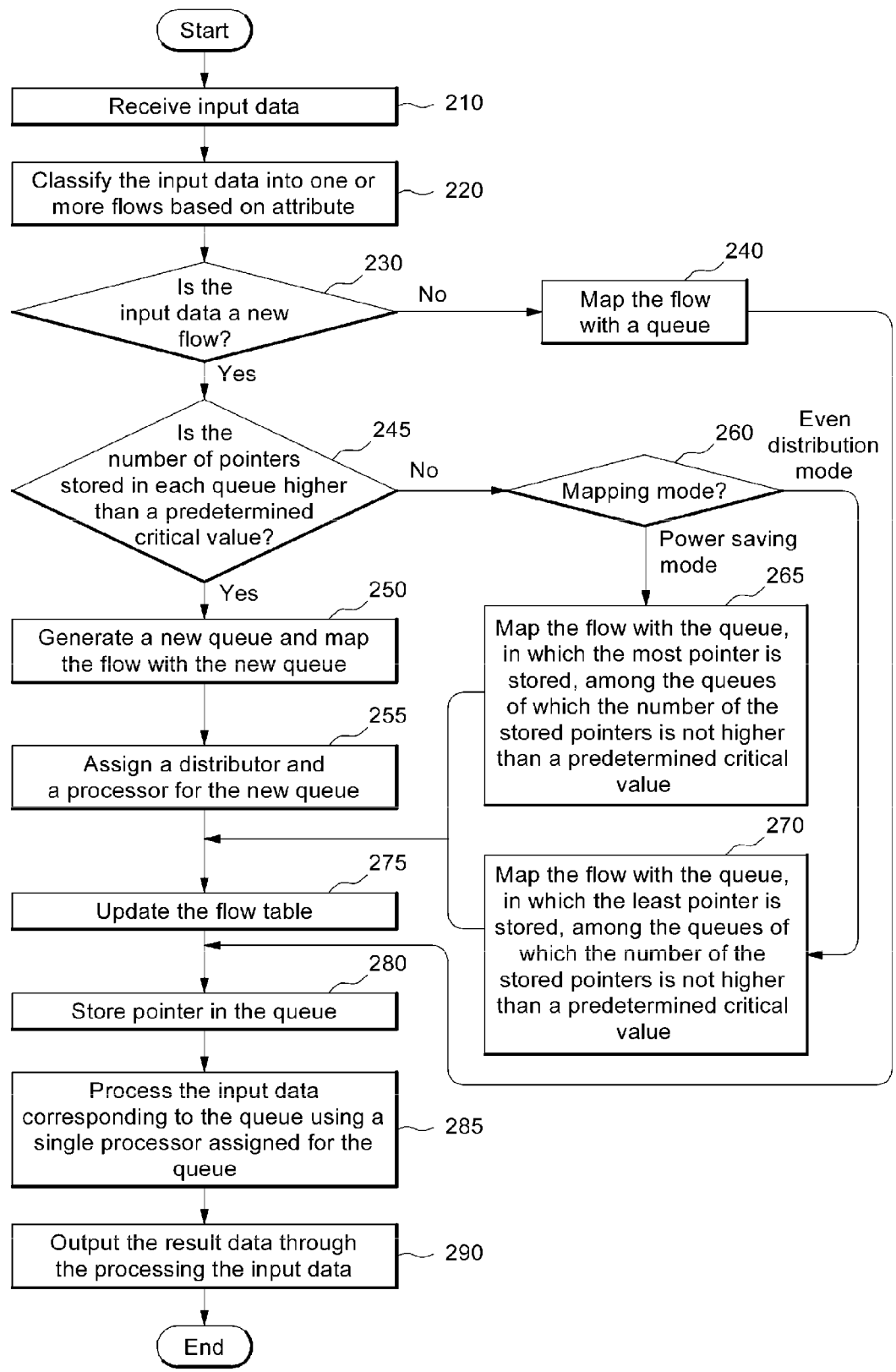
FIG. 2 is flowchart illustrating an example of a process for parallel processing by an example of an apparatus for parallel processing.
Figure 3:
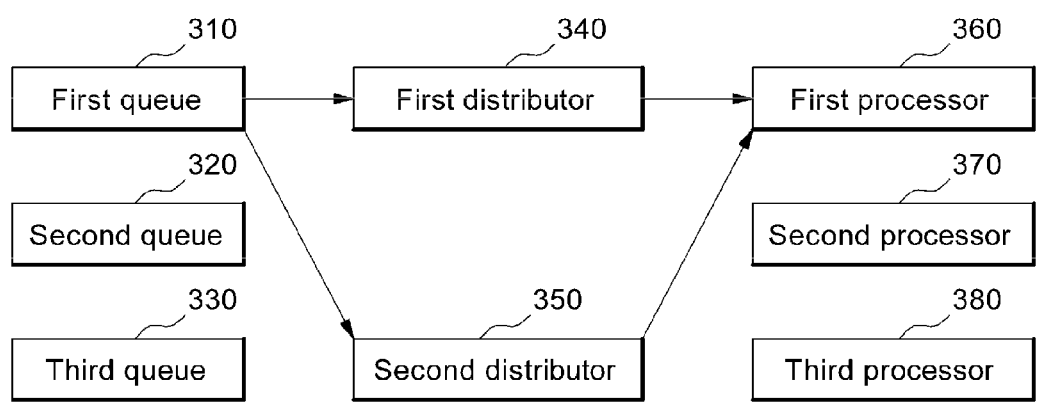
FIG. 3 is a diagram illustrating an example of a path of input data for each queue of an example of an apparatus for parallel processing into a processor.

FIG. 2 is flowchart illustrating an example of a process for parallel processing by an example of an apparatus for parallel processing, and FIG. 3 is a diagram illustrating an example of a path of input data for each queue of an example of an apparatus for parallel processing into a processor. The process to be explained below is performed through each unit of the apparatus for parallel processing. However, an object of each process will be called as apparatus for parallel processing for concise and clear description.

Referring to FIG. 2, in step 210, an apparatus for parallel processing according to an example may receive input data.

In step 220, the apparatus for parallel processing according to an example may classify the input data into one or more flows based on attribute thereof. For example, the apparatus for parallel processing may classify the input data into any one of flows based on a value bit-masked for a value included in a header of the input data such as SIP, DIP, SPORT, DPORT, PROTOCOL and the like. The apparatus for parallel processing may also classify the input data into any one of flows based on a value generated by applying a hash function for a value included in a header of the input data such as SIP, DIP, SPORT, DPORT, PROTOCOL and the like. Here, the apparatus for parallel processing may store the input data corresponding to each flow in the data memory 120.

In step 230, the apparatus for parallel processing may determine whether the input data corresponds to a new flow or not. For example, the apparatus for parallel processing may determine whether the input data corresponds to a new flow or not based on whether queue information is mapped with flow information corresponding to the input data in the flow table.

In step 230, when the input data is not a new flow, the apparatus for parallel processing may map the input data as an activated flow to a queue in step 240. For example, when flow information corresponding to the input data is stored in the flow table, the apparatus for parallel processing may extract queue information mapped to the flow information and store a pointer corresponding to the input data in a queue corresponding to the queue information.

When the input data is a new flow in step 230, the apparatus for parallel processing may determine whether all of the number of pointers stored in each queue is higher than a predetermined critical value by referring to the queue table in step 245.

When it is determined as that all of the number of pointers stored in each queue is higher than a predetermined critical value in step 245, the apparatus for parallel processing may generate the new queue and map new queue with the new flow in step 250.

In step 255, the apparatus for parallel processing may assign the distributor 160 and the processor 180 for the new queue. Here, the apparatus for parallel processing may assign a single processor 180 for the new queue.

When it is determined as that there is at least one queue of which the number of pointers is not higher than a predetermined critical value in step 245, the apparatus for parallel processing may determine what a mapping mode is in step 260.

When the mapping mode is determined as a power saving mode in step 260, the apparatus for parallel processing may map the flow with the queue, in which the most pointer is stored, among the queues of which the number of the stored pointers is not higher than a predetermined critical value in step 265.

When the mapping mode is determined as an even distribution mode in step 260, the apparatus for parallel processing may map the flow with the queue, in which the least pointer is stored, among the queues of which the number of the stored pointers is not higher than a predetermined critical value in step 270.

In step 275, the apparatus for parallel processing may update the flow table according the flow and the queue mapped in the previous step.

In step 280, the apparatus for parallel processing may store a pointer of the input data in a queue mapped with the flow.

In step 285, the apparatus for parallel processing may process the input data corresponding to each queue using a single processor (or a core) assigned for the queue. Here, since the apparatus for parallel processing assigns a single processor 180 for each queue, the input data corresponding to each queue may be transmitted to the single processor 180 through one or more distributors 160. For example, referring to FIG. 3, it is assumed that the apparatus for parallel processing activates a first queue 310, a second queue 320 and a third queue 330, a first distributor 340, a second distributor 350, a first processor 360, a second processor 370 and a third processor 380 and the first distributor 340, the second distributor 350 and the first processor 360 are assigned for the first queue 310. The apparatus for parallel processing may transmit input data corresponding to the first queue 310 to the first processor 360 through the first distributor 340 and the second distributor 350. Here, the apparatus for parallel processing may control not to transmit the input data corresponding to the first queue 310 to the processors 370, 380 rather than the first processor 360 so that processing order of the input data cannot be changed.

In step 290, the apparatus for parallel processing may output the result data through the processing the input data.

Exemplary embodiments of the present disclosure may be implemented in a computer system. At least one of the mapper 110, the table provider 130, the queue manager 150, the distributor 160, the distributor manager 170 and the processor manager 190 of the apparatus for parallel processing according to an example may be implemented to process using the processor 180 as a software module stored in a computer readable medium.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for parallel processing comprising:
    a queue memory configured to store one or more queues,
    a data memory configured to store data,
    a mapper configured to classify the data into flows and store a pointer of the data in a queue mapped with the flow;
    a table provider configured to store a flow table comprising queue information mapped with flow information;
    a plurality of processors configured to perform a process based on the data; and
    a distributor configured to extract the data from the data memory by referring to the pointer stored in the queue and transmit the data to the processor,
    wherein the distributor transmits data corresponding to a single queue to a single processor, and
    wherein the mapper maps each of the flows with a new queue or an activated queue based on the number of pointers stored in each activated queue and a predetermined critical value when the activated queue is not mapped with the flow by referring to the flow table.

2. The apparatus of claim 1,
    wherein the mapper identifies the queue mapped with the flow by referring to the flow table.

3. The apparatus of claim 1, wherein the mapper maps the flow with the new queue when all of the number of pointers stored in each activated queue is higher than a predetermined critical value, and
    wherein the mapper maps the flow with the activated queue when there is at least one activated queue of which the number of pointers is not higher than a predetermined critical value.

4. The apparatus of claim 3, further comprising a distributor manager configured to assign a distributor for the new queue when the mapper maps the flow with the new queue; and a processor manager configured to assign a single processor for the new queue.

5. The apparatus of claim 3, wherein the mapper maps the flow with the queue where the least pointer is stored among the activated queues when there is at least one activated queue of which the number of pointers is not higher than a predetermined critical value and a mapping mode is a power saving mode.

6. The apparatus of claim 3, wherein the mapper maps the flow with the queue where the most pointer is stored among the activated queues when there is at least one activated queue of which the number of pointers is not higher than a predetermined critical value and a mapping mode is an even distribution mode.

7. A method for parallel processing in which an apparatus for parallel processing performs a parallel processing, the method comprising:
    receiving data and storing the data in a data memory;
    classifying the data into flows;
    storing a pointer of the data in a queue which is mapped with the flow;
    storing a flow table comprising queue information mapped with flow information;

extracting the data from the data memory by referring to the pointer stored in the queue and transmitting the data to a processor which is assigned for the queue; and performing a process corresponding to the data using the processor assigned for the queue, mapping each of the flows with a new queue or an activated queue based on the number of pointers stored in each activated queue and a predetermined critical value when the flow is not mapped with the activated queue by referring to the flow table.

8. The method of claim 7, further comprising identifying a queue mapped with the flow by referring to the flow table.

9. The method of claim 7, wherein the mapping the flow with a new queue or an activated queue based on the number of pointers stored in each activated queue and a predetermined critical value when the flow is not mapped with the activated queue by referring to the flow table, comprises:

mapping the flow with a new queue when flow information corresponding to the flow is not stored in the flow table and all of the number of pointers stored in each activated queue is higher than a predetermined critical value; and mapping the flow with an activated queue when flow information corresponding to the flow is not stored in the flow table and there is at least one activated queue of which the number of pointers is not higher than a predetermined critical value.

10. The method of claim 9, further comprising assigning a distributor for the new queue when the flow is mapped with the new queue; and assigning a single processor for the new queue.

11. The method of claim 9, wherein the mapping the flow with an activated queue when flow information corresponding to the flow is not stored in the flow table and there is at least one activated queue of which the number of pointers is not higher than a predetermined critical value, comprises mapping the flow with the queue where the least pointer is stored among the activated queues when a mapping mode is a power saving mode.

12. The method claim 9, wherein the mapping the flow with an activated queue when flow information corresponding to the flow is not stored in the flow table and there is at least one activated queue of which the number of pointers is not higher than a predetermined critical value, comprises mapping the flow with the queue where the most pointer is stored among the activated queues.

* * * * *